June 23, 1931.    T. A. APPIA    1,811,105
EDUCATIONAL APPLIANCE
Filed June 6, 1929    4 Sheets-Sheet 1
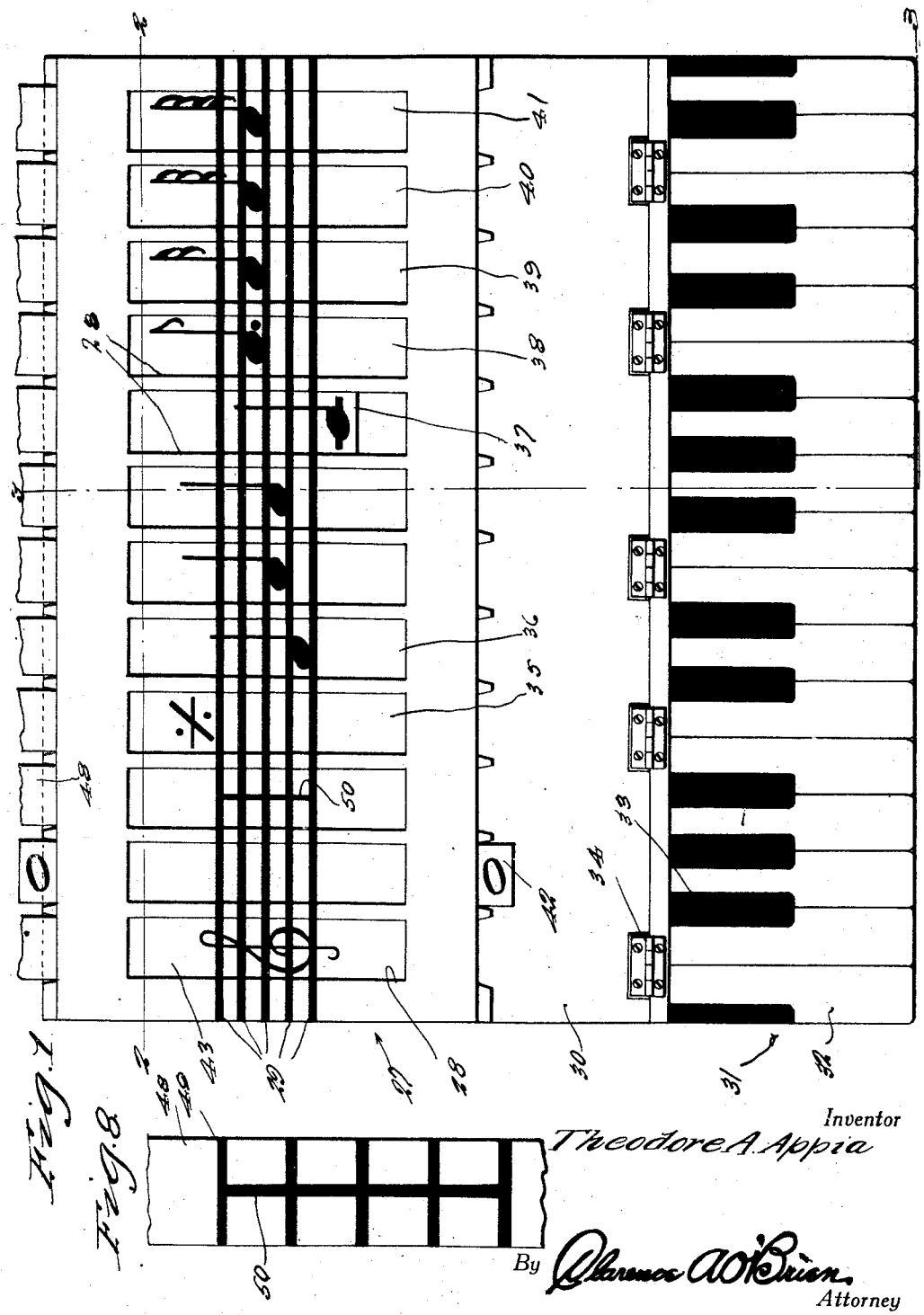
Inventor
Theodore A. Appia
By Clarence A. O'Brien
Attorney June 23, 1931. T. A. APPIA 1,811,105
EDUCATIONAL APPLIANCE
Filed June 6, 1929 4 Sheets-Sheet 2
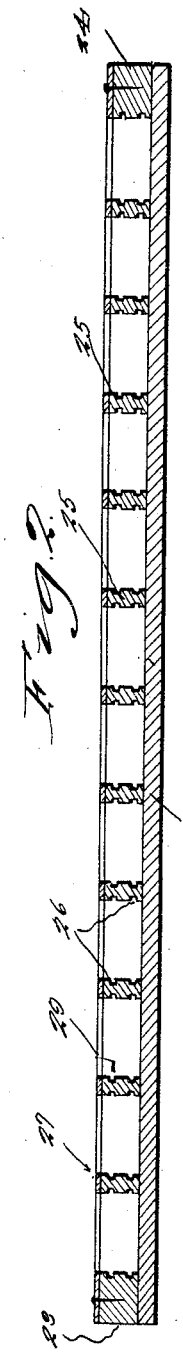
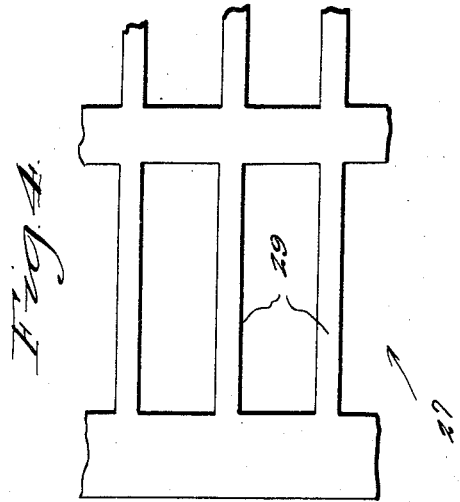
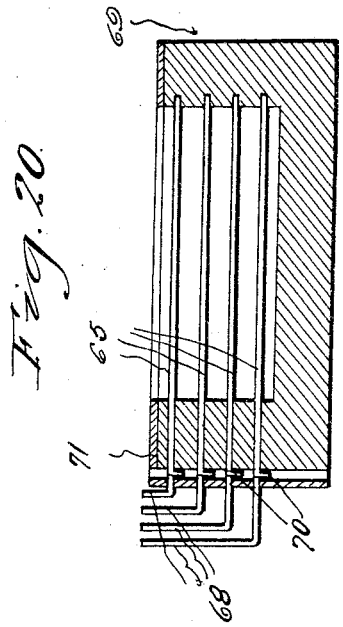
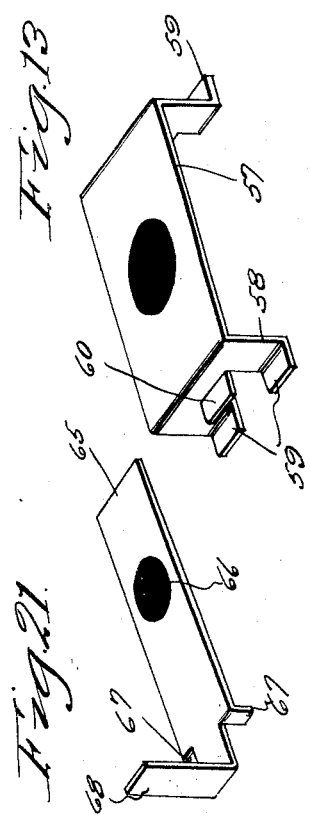
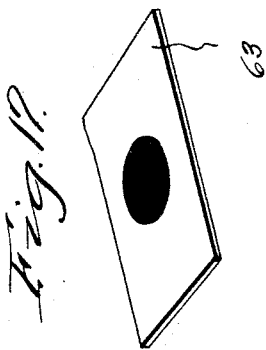
Inventor
*Theodore A. Appia*
By *Clarence A. O'Brien*
Attorney June 23, 1931. T. A. APPIA 1,811,105
EDUCATIONAL APPLIANCE
Filed June 6, 1929  4 Sheets-Sheet 3
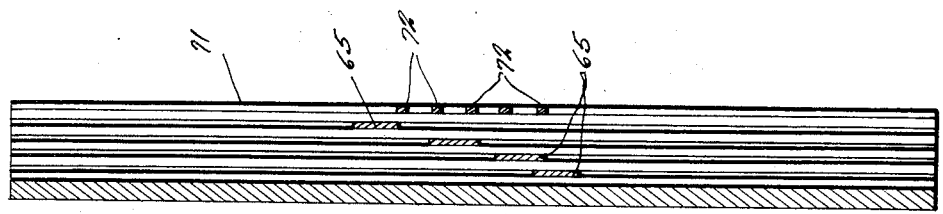
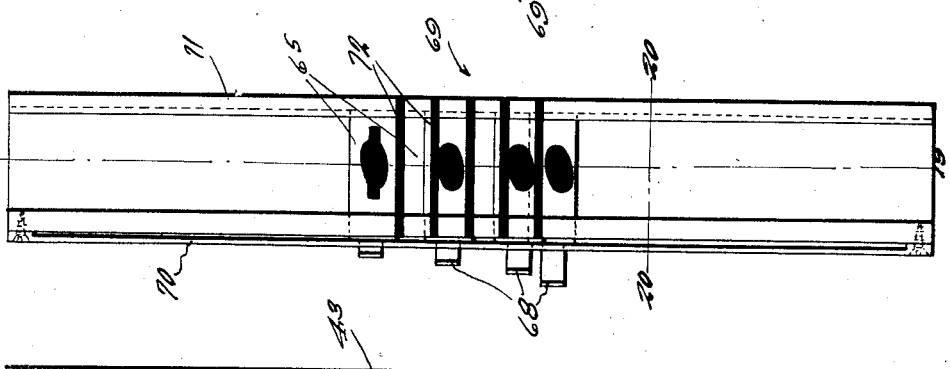
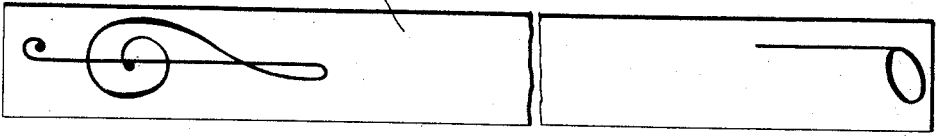
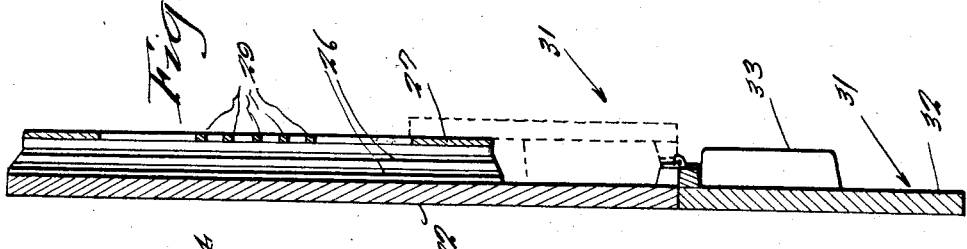
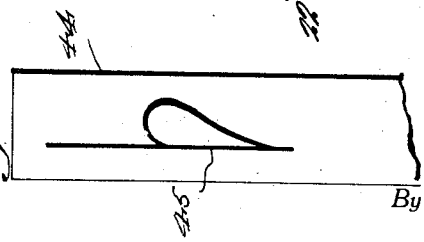
Inventor
Theodore A. Appia
By Clarence A. O'Brien
Attorney June 23, 1931.                T. A. APPIA                1,811,105
                        EDUCATIONAL APPLIANCE
                   Filed June 6, 1929      4 Sheets-Sheet 4
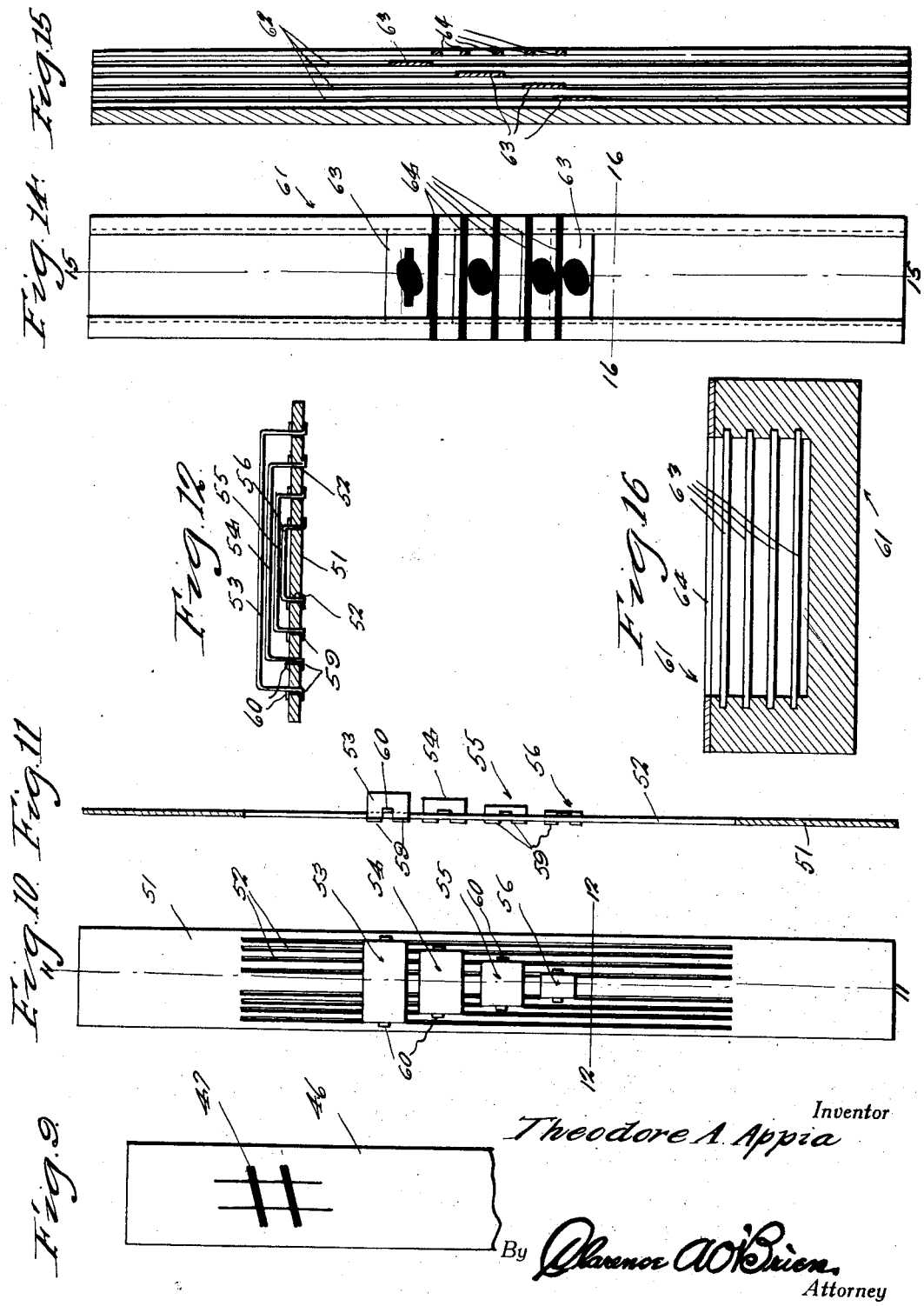
Inventor
Theodore A. Appia
By Clarence A. O'Brien,
Attorney

Patented June 23, 1931

1,811,105

UNITED STATES PATENT OFFICE

THÉODORE A. APPIA, OF NEW YORK, N. Y.

EDUCATIONAL APPLIANCE

Application filed June 6, 1929. Serial No. 368,846.

This invention relates to an improved educational appliance in the nature of a musical notation chart, characterized by a novel arrangement of physical features cooperating in producing a means for conveniently and systematically teaching and studying music by creative means.

More specifically stated, I have evolved and produced a device which may be used by the teacher on a large sized structure, or by the pupil or student on a small sized structure, in studying the fundamentals of music and musical notations, with a view toward learning rhythm, melody, harmony, polyphony, ear training and sight reading.

I have evolved and produced a novel mechanical structure including graphically depicted and properly charted features cooperating in providing a structure, which offers the advantages of private instruction and which enables children of kindergarten age to acquire a working knowledge of the fundamentals of music.

By the use of the invention all of the rudimentary principles of music may be taught in a creative way by actual experience of handling the physical elements of the device. Not only may all fundamentals be taught, but they may be brought into practice. Thus it is possible through the medium of the device to acquire ear training and sight reading as well as to learn rhythm, melody, polyphonic and harmonic composition.

The device is constructed to be used by the teacher or pupil or both and includes a substantially game-like structure, which is fascinating and combines play with study, thus permitting the student's creative sense to be awakened.

The device is recreational, since the novelty of the details creates a sense of interest and draws the child to learn the rudiments of musical notation at the very beginning, thus making it applicable and especially useful for school room use, or home use, whichever is desired.

The particular structural details and their specific association and arrangement will become more readily apparent from the following description and drawings.

In the drawings:

Figure 1 is a top plan view of the complete appliances constructed in accordance with the present invention.

Figure 2 is a longitudinal sectional view, taken approximately upon the plane of the line 2—2 of Figure 1.

Figure 3 is a sectional view at right angles, the section being taken approximately upon the plane of the line 3—3 of Figure 1.

Figure 4 is a fragmentary view of an especially constructed part to be hereinafter referred to as a panel.

Figures 5, 7, 8 and 9 are views of slides with different indicia thereon. Figure 6 is an edge view of a slide.

Figure 10 is a top plan view of an adjustable slide having individually adjustable indicators thereon.

Figure 11 is a longitudinal section on the line 11—11 of Figure 10.

Figure 12 is a cross section on the line 12—12 of Figure 10.

Figure 13 is a perspective view of one of the slides seen in Figures 10 to 12 inclusive.

Figure 14 is a top plan view of a slightly different embodiment of the invention.

Figure 15 is a longitudinal section on the line 15—15 of Figure 14.

Figure 16 is an enlarged cross section, taken on the line 16—16 of Figure 14.

Figure 17 is a perspective view of one of the indicators used in the device seen in Figure 14.

Figure 18 is still another modification of the invention.

Figure 19 is a longitudinal section on the line 19—19 of Figure 18.

Figure 20 is a cross section on the line 20—20 of Figure 18.

Figure 21 is a perspective view of one of the slide indicators seen in Figure 18.

The principal embodiment of the invention is seen in Figures 1 and 2. As shown for instance in Figure 2, the reference character 22 designates a base board of appropriate dimensions and materials. Attached to the upper side of this and at the opposite ends are end blocks or strips 23, and 24, and between these are individual partition strips 25. These strips 25 form intervening guideways to accommodate the slides. There are various types of slides and each one is generally in the form of an elongated rectangular card having appropriate musical symbols or indicia thereon. Before considering these cards, however, I wish to call attention to the reference characters 26 in Figure 2, which designates guide channels in which the edge portions of the cards are slidable, and in addition the reference character 27 in Figure 4 designates the panel which is fastened over the blocks 23, 24 and 25 as seen in Figure 2. This panel is stamped out to provide a multiplicity of sight openings 28 as represented in Figure 1. It is further provided with horizontal parallel strip like elements 29, painted black to represent a conventional staff.

As observed in Figure 1, the reference character 30 designates an extension at the bottom, whose face may be blackened to provide a black board on which notes may be written with chalk or the like. The reference character 31 designates a dummy piano key board. I have represented merely a portion of the board and shown the white keys 32 and the raised black keys 33. This board is hinged as at 34 to the main base board and may be swung up out of the way to the dotted line position seen in Figure 3. At this time, I wish to call attention to the fact that the end portions of the partition strip 25 are bevelled as seen in Figure 1, to facilitate insertion and removal of the cards. Moreover, the channel shaped guideways are opened at opposite ends to permit the cards to be inserted either from the top or the bottom.

The cards are provided with printed or written musical indicia or symbols of the customary forms employed in scoring musical notations. For example, as seen in Figure 1, the reference character 35 is provided with designations utilized as a repetition sign, 36 is provided with the quarter notes, 37 the quarter notes on the first line below the staff, 38 with a dotted eighth note, and in addition 39 represents a sixteenth note, 40 a thirty-second note, and 41 a sixty-fourth note. The card 42 is provided with whole notes. The card 43 is provided with a double clef signature.

The slide or card 43 is seen in Figure 5. In Figure 7 the slide 44 is provided with indicia 45, representing a flat, the card 46 in Figure 9 is provided with a sharp 47 and a card 48 in Figure 8 is provided with lines 49 adapted to be aligned with the staff lines as seen in Figure 1. This is provided with a heavy line 50 which cooperates with the staff line in forming the representation of a bar in music.

Referring now to Figure 10, it will be seen that 51 designates a slide having a multiplicity of longitudinal slots 52 arranged in parallel pairs to accommodate the various slidable indicators 53, 54, 55 and 56. These slides are of the type seen in Figure 13, each one comprising a plate 57 having leg portions 58 provided with laterally turned feet 59, slidable in the complemental slot and further provided with a retaining tongue 60 cooperable with the slot to maintain the desired rigidity of action. These slides are formed with symbols or characters of appropriate nature and are generally used in groups of four and are graduated in size to permit them to be individually adjusted if desired or nested within one another as shown in Figure 12. They may therefore be used in groups of two or more or in a single group for chords. This completes the slide 51 which may be used on the main chart or board in a manner already described.

It is contemplated to provide a pocket device for the formation of chords. Take for example the structure seen in Figures 14 to 17 inclusive. Here the reference character 61 designates a body of open ended channel shaped cross section with its side walls formed with a group of four guideways or channels 62. These are intended to accommodate the individual slides 63, which cooperate with a miniature staff, the lines of which are designated by the reference character 64.

These elements 64 may be employed conveniently for the formation of different chords. It will be noticed from Figure 16 that they are arranged in individual guide channels 62 so that they may be separately adjusted or arranged underneath one another as shown for instance in Figure 16.

The similar idea is carried out in the construction represented in Figures 18 to 21 inclusive. Here I provide a group of indicators or slides, four in number, each of which is designated by the reference character 65 in Figure 20. These are merely in the form of small plates having musical indicia 66 formed thereon and provided at one end with downturned guide lips 67 and an upturned right angularly bent operating finger grip or handle 68. In this connection it will be observed in Figure 20 that the body 69 is of channel shaped cross section and formed in one side wall with grooves to accommodate the group slides and formed in the opposite side walls with slots through which the opposite end portions of the slides extend. The reference character 70 designates a guide runner along one side of the structure. The reference character 71 designates a facing panel formed with cross lines 72, forming the staff seen in Figure 18.

By use of individual cards with diverse musical symbols thereon an unlimited amount of musical and rhythmical combinations are obtainable, the same being composed by the pupil or teacher, or taken from a fixed set of exercises.

The device may be used by any teacher of music under any system of teaching whatsoever.

By the use of the device shown in Figure 14 and in Figure 18, the pupil may study chords in a manner other than the standard method of teaching chords by fixed combinations of notes. The pupil may employ his or her creative imagination in the study of these harmonic cadences. The movable parts of Figure 14 and Figure 18 are an aid in the mastery of chord studies since the pupil recognizes and understands tonal differences by the space of the movement of the individual parts of the device.

The employment of the device by the pupil in creative composition aids ear training in that the melody is imagined before hand in the mind of the child.

The study of intervals becomes simple by the use of the device since the notes in the intervals may be changed with great speed and facility.

The mute immovable keyboard is attached to the device for the purpose of acquainting the pupil with the keyboard of the piano and the relative notes thereon and to aid ear training by giving the pupil a physical conception of the musical idea which he or she has in mind.

The blackboard may be fixed to the device for explanation purposes.

The materials that may be used in the construction may be either metal, aluminum, wood, fiber or otherwise. The board itself may be black with a white covered staff or vice versa. Different color schemes may be used in practice.

The sheets of cards to be inserted in the grooves in the main embodiment of the invention are provided with painted or printed notes, rests, musical symbols of all characters. Both sides of the cards are provided for sake of completeness. Then too, the reverse side of the main base board may be made into a blackboard for written exercises. By the system of cards made separately and insertable individually in the guide groove, no fixed or standard set of musical indicia is needed. The teacher may give his own examples or have the pupils compose them on their individual boards. Both the teacher and pupil may operate separate devices. Moreover the device is usable in a practical manner for teaching both vocal and instrumental music.

A careful consideration of the description in conjunction with the drawings will enable the reader to obtain a clear understanding of the construction, manipulation and features and advantages of the improved device. Therefore a more lengthy description is believed unnecessary.

Various changes in the shape, size and arrangement of details coming within the field of invention claimed may be resorted to, in actual practice, if desired.

What is claimed as new is:

1. In an educational appliance of the class described, a base, a multiplicity of longitudinally spaced partitioning strips secured on said base and having their outer ends terminating flush with one longitudinal edge of the base, the inner ends of said strips being spaced from the remaining longitudinal edge of the base to form a writing area, said strips co-operating with each other and said base in forming open-ended guides, indicia equipped slides removably and slidably positioned in said guides, and projectable through the opposite open ends of the guides, and a facing panel fastened across the strip in spaced parallelism to the base, said panel having sight openings at longitudinally spaced points in registry with said guides, the panel being further provided with members intersecting said sight openings and arranged with respect to each other to provide a musical notation staff for co-operation with the indicia on said slides.

2. In an educational appliance of the class described, a base, a multiplicity of longitudinally spaced partitioning strips secured on said base and having their outer ends terminating flush with one longitudinal edge of the base, the inner ends of said strips being spaced from the remaining longitudinal edge of the base to form a writing area, said strips co-operating with each other and said base in forming open-ended guides, indicia equipped slides removably and slidably positioned in said guides, and projectable through the opposite open ends of the guides, and a facing panel fastened across the strip in spaced parallelism to the base, said panel having sight openings at longitudinally spaced points in registry with said guides, the panel being further provided with members intersecting said sight openings and arranged with respect to each other to provide a musical notation staff for co-operation with the indicia on said slides, said panel being of a width less than the length of the strip, and the opposite ends of the strips projecting beyond the corresponding longitudinal edges of the panel, said projecting ends being bevelled to facilitate insertion and removal of the slides.

3. In an educational appliance of the class described, a substantially rectangular base board provided along one longitudinal edge with a multiplicity of longitudinally spaced guides, an apertured panel overlying said guides and formed with a musical notation staff, indicia slides arranged in the guides and co-operable with the staff, a dummy piano keyboard hingedly connected along one longitudinal edge of the base, said keyboard being foldable into overlapping relation with an unobstructed portion of the base, said unobstructed portion serving when exposed, as a writing surface.

4. In an appliance of the class described, a slide provided with a plurality of longitudinal slits, an assembly of indicators, said indicators being arranged in a graduated group and having portions slidably engageable with said slits, the indicators being individually adjustable and susceptible of being moved into overlapped nested relationship so as to permit the indicator to be brought selectively into use.

5. An educational appliance designed to aid in the formation of musical chords comprising a unitary body of open-ended channel-shaped cross section, the walls of the channel being formed with longitudinal superposed series of guide grooves, a miniature musical notation staff formed on the intermediate portion of said body, a plurality of indicators having individual mounting in opposed pairs of said grooves.

In testimony whereof I affix my signature.

THÉODORE A. APPIA.